(12) United States Patent
Ahmed

(10) Patent No.: US 9,513,067 B2
(45) Date of Patent: Dec. 6, 2016

(54) CONVECTION BASED TEMPERATURE ASSURED PACKAGING SYSTEM

(71) Applicant: Sonoco Development, Inc., Hartsville, SC (US)

(72) Inventor: Iftekhar Ahmed, Pierrefonds (CA)

(73) Assignee: Sonoco Development, Inc., Hartsville, SC (US)

( * ) Notice: Subject to any disclaimer, the term of this patent is extended or adjusted under 35 U.S.C. 154(b) by 306 days.

(21) Appl. No.: 13/752,894

(22) Filed: Jan. 29, 2013

(65) Prior Publication Data

US 2014/0083650 A1 Mar. 27, 2014

Related U.S. Application Data

(60) Provisional application No. 61/705,995, filed on Sep. 26, 2012.

(51) Int. Cl.
*F25D 3/08* (2006.01)
*F28F 3/00* (2006.01)
(Continued)

(52) U.S. Cl.
CPC .................. *F28F 3/00* (2013.01); *B23P 15/26* (2013.01); *B65D 19/06* (2013.01);
(Continued)

(58) Field of Classification Search
CPC ............. F25D 3/06; F25D 3/08; F25D 17/06; F25D 2303/0844; F25D 2303/0845; B65D 81/05; B65D 81/055; B65D 81/07; B65D 81/075; B65D 81/127; B65D 81/1275; B65D 81/3823; B65D 2519/00044; B65D 2519/00159; B65D 2519/00716; B65D 2519/00666; B65D 2519/00621; B65D 2519/00502; B65D 2519/00353; B65D 2519/00333; B65D 2519/00323; B65D 2519/00273; B65D 2519/00208; B65D 2519/00174; B65D 2519/00099; B65D 2519/00064; B65D 2519/00034; B65D 2519/00029; B65D 2519/00019; B23P 15/26; F28F 3/00; Y10T 29/493559
(Continued)

(56) References Cited

U.S. PATENT DOCUMENTS 1,688,023 A * 10/1928 Scarlett .................... F25D 3/00
220/592.14
2,325,371 A * 7/1943 Clerc .................... B65D 81/18
220/592.05
(Continued)

FOREIGN PATENT DOCUMENTS

WO 2011046940 A1 4/2011

*Primary Examiner* — Len Tran
*Assistant Examiner* — Ana Vazquez
(74) *Attorney, Agent, or Firm* — Miller Matthias & Hull LLP

(57) ABSTRACT

A packaging system for a temperature sensitive payload is provided. The system includes insulative panels, including side panels and end panels, forming a product compartment. Cooling layers within the product compartment are located below and above the payload. Vertical posts disposed between the side panels and the payload and between the end panels and the payload create spaces and channels for convective air movement.

10 Claims, 4 Drawing Sheets

(51) Int. Cl.
*B23P 15/26* (2006.01)
*B65D 19/06* (2006.01)
*B65D 81/38* (2006.01)
*F25D 3/06* (2006.01)

(52) U.S. Cl.
CPC ........... *B65D 81/3823* (2013.01); *F25D 3/06* (2013.01); *B65D 2519/00019* (2013.01); *B65D 2519/00029* (2013.01); *B65D 2519/00034* (2013.01); *B65D 2519/00044* (2013.01); *B65D 2519/00064* (2013.01); *B65D 2519/00099* (2013.01); *B65D 2519/00159* (2013.01); *B65D 2519/00174* (2013.01); *B65D 2519/00184* (2013.01); *B65D 2519/00194* (2013.01); *B65D 2519/00208* (2013.01); *B65D 2519/00218* (2013.01); *B65D 2519/00273* (2013.01); *B65D 2519/00323* (2013.01); *B65D 2519/00333* (2013.01); *B65D 2519/00353* (2013.01); *B65D 2519/00502* (2013.01); *B65D 2519/00621* (2013.01); *B65D 2519/00666* (2013.01); *B65D 2519/00716* (2013.01); *F25D 2303/0844* (2013.01); *F25D 2303/0845* (2013.01); *Y10T 29/49359* (2015.01)

(58) Field of Classification Search
USPC .............................. 62/60, 371, 372; 165/148
See application file for complete search history.

(56) References Cited

U.S. PATENT DOCUMENTS

| | | | |
|---|---|---|---|
| 3,648,920 A * | 3/1972 | Stump | B65D 5/5033 138/177 |
| 5,669,233 A * | 9/1997 | Cook et al. | 62/371 |
| 6,189,330 B1 * | 2/2001 | Retallick et al. | 62/371 |
| 6,765,031 B2 | 7/2004 | Salyer et al. | |
| 7,357,271 B2 | 4/2008 | Hase et al. | |
| 8,607,581 B2 * | 12/2013 | Williams et al. | 62/62 |
| 2005/0235673 A1 * | 10/2005 | Sueoka et al. | 62/271 |
| 2006/0174648 A1 * | 8/2006 | Lantz | 62/371 |
| 2007/0271947 A1 | 11/2007 | Hase et al. | |
| 2010/0147837 A1 | 6/2010 | Williams | |

* cited by examiner

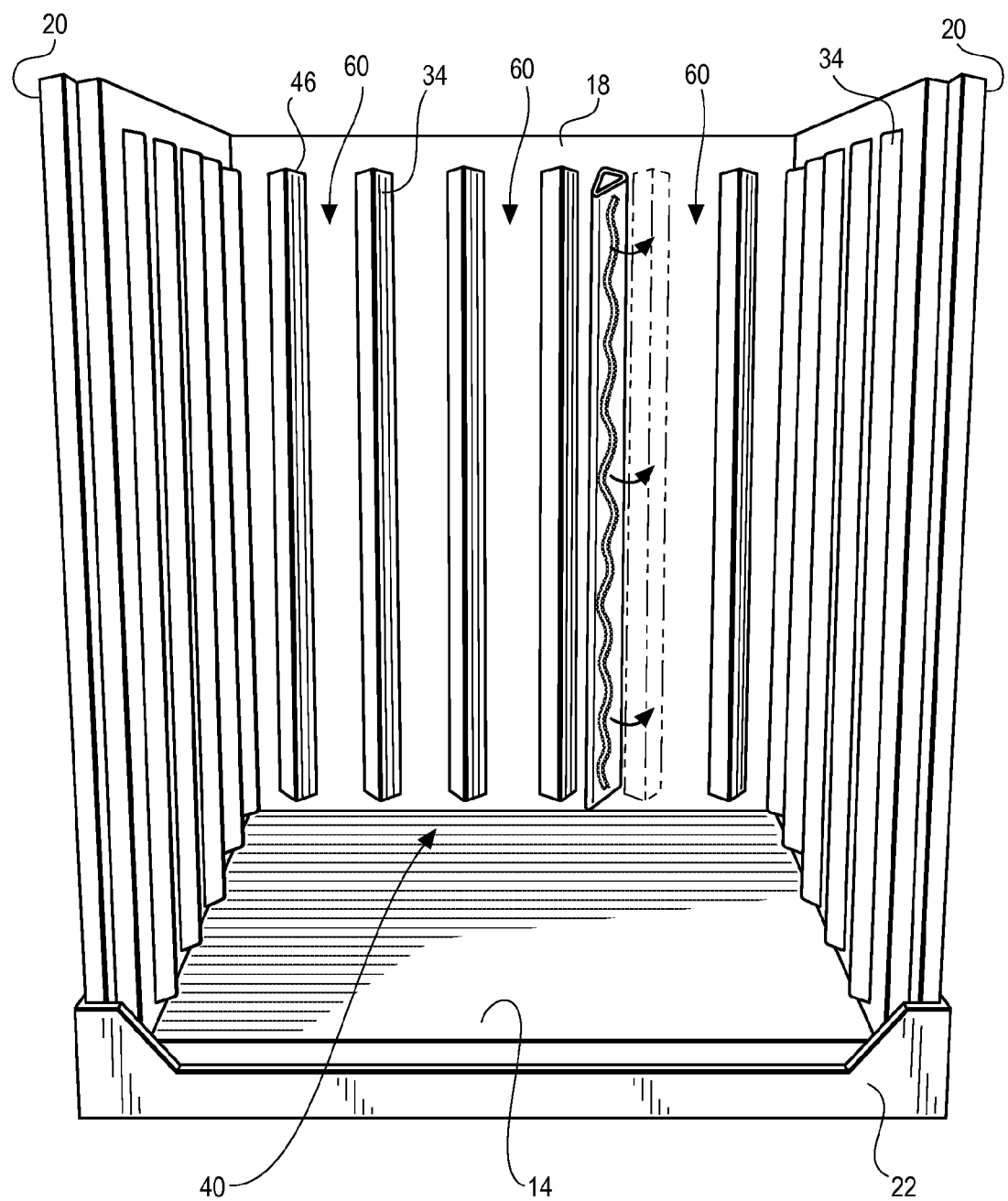

CONVECTION BASED TEMPERATURE ASSURED PACKAGING SYSTEM

FIELD OF THE INVENTION

This invention relates to a packaging system for shipping temperature sensitive products. More particularly, this invention relates to a packaging system for shipping temperature sensitive products that reduces or eliminates the need for side refrigerant components and improves thermal performance.

DESCRIPTION OF THE RELATED ART

Current pallet shippers for use with temperature sensitive products use side refrigerant components in addition to top and bottom refrigerant components to surround the products on six sides. These types of pallet shippers generally are assembled by loading the products into the shipper and then inserting refrigerants around the products.

This six-sided configuration is inefficient in terms of packing out the product and the refrigerants. For example, refrigerants inserted along the sides of the product shipper between the products and the outer container can fall over and otherwise change position within the shipper. The use of side refrigerants also results in increased weight and shipping cost.

Yet eliminating side refrigerants can result in the products getting too warm. For temperature sensitive products, such as those which must be maintained at a temperature not exceeding 15 C (59 F), eliminating the side refrigerants has heretofore been an unacceptable option.

The present invention is designed to solve the problems described above.

BRIEF SUMMARY OF THE INVENTION

The present invention is a packaging system that utilizes a convection based cooling approach to eliminate the need for side refrigerants and increase packaging efficiency. The invention also reduces the amount of refrigerants required.

In one aspect of the invention a packaging system is provided that comprises housing defining a product compartment for holding a temperature sensitive payload, one or more bottom cooling layers, a plurality of hollow vertical posts and one or more top cooling layers. The housing comprises a bottom panel, a top panel located above and in spaced vertical alignment to the bottom panel, side panels extending vertically between the bottom panel and the top panel, and end panels extending vertically between the bottom panel and the top panel. The bottom cooling layers are located between the bottom panel and the payload. The top cooling layers are located between the payload and the top panel. The hollow vertical posts are disposed within the product compartment adjacent the side panels or end panels. Each vertical post has an open top end and an open bottom end and defines a vertical inner space within the post. Adjacent vertical posts define a vertically oriented channel between the vertical posts. It is believed that warm air rises through the inner spaces in the vertical posts until the air exits the posts and is cooled by the top cooling layers. The relatively denser cooled air then falls through the channels between the posts, contacting and cooling the payload. Each vertical post should be spaced an optimized distance to allow air to flow through the vertical inner space within each vertical post.

A spacer may be disposed within the product compartment adjacent the bottom panel to further enhance air circulation. The spacer comprises a sheet with spaced stubs to facilitate airflow.

In a refinement of the invention each vertical post has a triangular cross sectional profile and comprises an outer facing side adjacent the side panels or end panels and two angled sides extending from opposing vertical edges of the outer facing side and meeting along an elongated vertical inner edge. Each vertical post should be at least one inch deep and, preferably between one and one and one-half inches deep when measured from the outer facing side to the inner edge.

In another refinement each of the bottom cooling layers comprises multiple refrigerant components arranged edge to edge to form a layer within the packaging system. Each refrigerant component may comprise a phase change material (such as water) and a protective outer container.

In another refinement each of the top cooling layers comprises a layer of refrigerant components arranged edge to edge to form a top refrigerant layer located immediately adjacent the payload, and at least one layer and preferably three layers of frozen components arranged edge to edge to form a top frozen layer disposed between the top refrigerant layer and the top panel. Each frozen component may comprise a phase change material and a protective outer container.

In another aspect of the invention a method of assembling a packaging system for a temperature sensitive payload is provided. The method comprises the steps of providing a bottom panel, a top panel, two side panels and two end panels; affixing hollow vertical posts to an inner (product) facing surface of at least one of the side panels or end panels; providing a bottom tray comprising a bottom wall and side walls extending upward from the periphery of the bottom wall; placing the bottom panel into the bottom tray; inserting a side panel and both end panels into the bottom tray between the side walls and the bottom panel to form a three sided enclosure; placing a spacer on top of the bottom panel; placing at least one bottom cooling layer into the three sided enclosure; loading the payload into the enclosure on top of the at least one bottom cooling layer; placing at least one top cooling layer into the three sided enclosure on top of the payload; wedging a side panel between a side wall and the bottom panel to form a four sided enclosure; and placing the top panel onto the side panels and the end panels.

In still another aspect of the invention a method of maintaining a payload within a desired temperature range is provided. The method comprises the steps of:

(a) loading the payload into a packaging system comprising a housing having a bottom, top and vertical sides, cooling layers disposed above and below the payload, hollow vertical posts disposed between the payload and the vertical sides of the housing, the vertical posts defining inner spaces within the vertical posts and channels between adjacent vertical posts;

(b) allowing relatively warmer air to rise within the inner spaces of the vertical posts until it exits the vertical posts and is cooled by the cooling layers above the payload to form cooled air; and (c) allowing the cooled air to fall through the channels while contacting the payload.

BRIEF DESCRIPTION OF THE DRAWINGS

FIG. 6 is a perspective view of a partially assembled packaging system according to the invention.

DETAILED DESCRIPTION OF THE INVENTION

Figure 1:
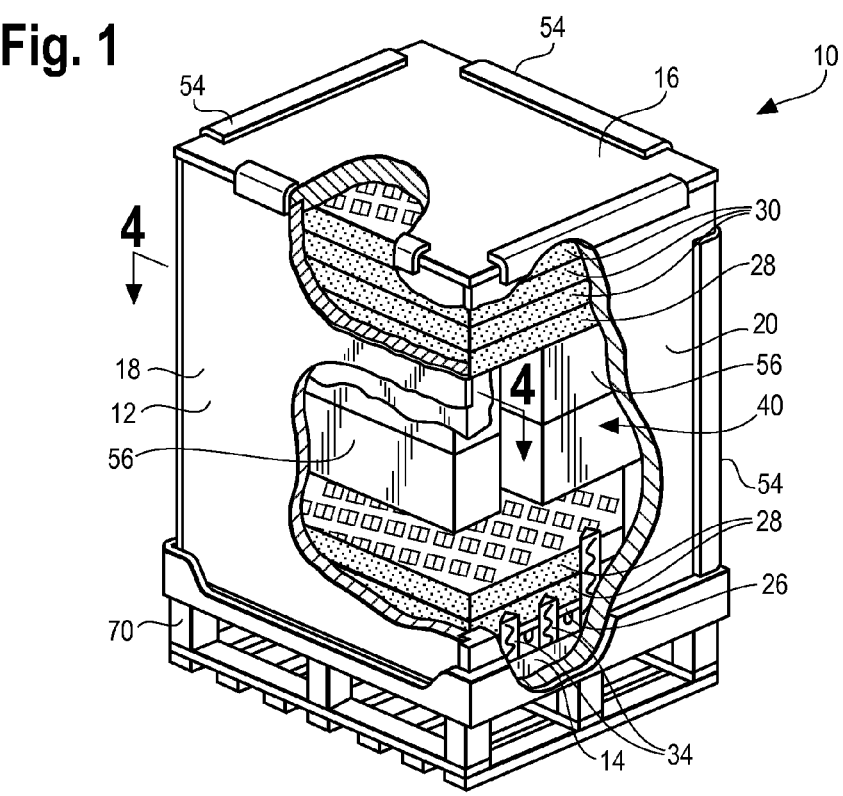
FIG. 1 is a cutaway perspective view of a packaging system according to the invention.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

The Packaging System

Figure 3:
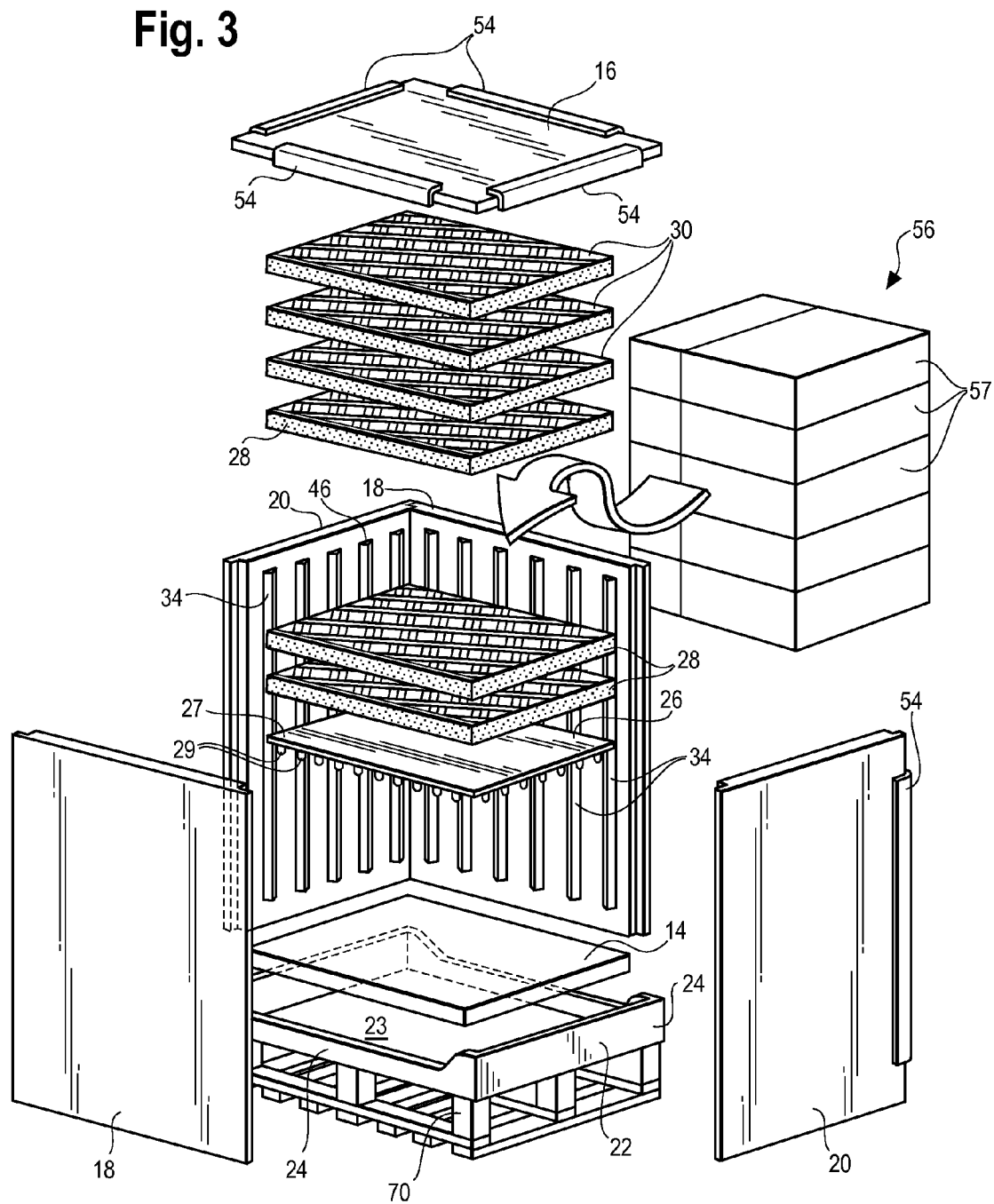
FIG. 3 is an exploded view of the packaging system of FIG. 1.

Turning to the drawings, there is shown in the figures one embodiment of the present invention, a packaging system for temperature sensitive products. As best shown in FIGS. 1 and 3, the packaging system 10 comprises a housing 12 that functions as a protective enclosure for the packaging system contents. The housing 12 comprises a bottom panel 14, a top panel 16, two side panels 18 and two end panels 20. The side panels 18 and the end panels 20 extend vertically between the bottom panel 14 and the top panel 16 to form the housing 12. The bottom panel 14 as well as the lower portions of the side panels 18 and the end panels 20 may fit within a bottom tray 22. The packaging system 10 may be wrapped in transparent wrapping (not shown) and placed on a pallet 70.

As best shown in FIG. 3 the bottom tray 22 comprises a bottom wall 23 and four side walls 24 extending upward from the periphery of the bottom wall 23. The bottom panel 14 is disposed within the bottom tray 22. Preferably there are spaces between the periphery of the bottom panel 14 and the tray side walls 24 for accommodating the lower portions of the side panels 18 and the end panels 20.

Each outer panel, that is, the bottom panel 14, the top panel 16, the two side panels 18 and the two end panels 20, may be made of a rigid molded polyurethane (PUR) inner core, preferably about 2¾ inches thick, enclosed within an outer corrugated cardboard shell. Each outer panel may be configured to interlock with each orthogonally adjacent outer panel. Corner board 54 may be glued or otherwise adhered to the adjoining edges of each pair of orthogonally oriented outer panels.

The housing 12 defines a product compartment 40 in which a payload 56 may be placed for shipping. Typically but without limitation the payload 56 may be stacked product containers 57.

Figure 2:
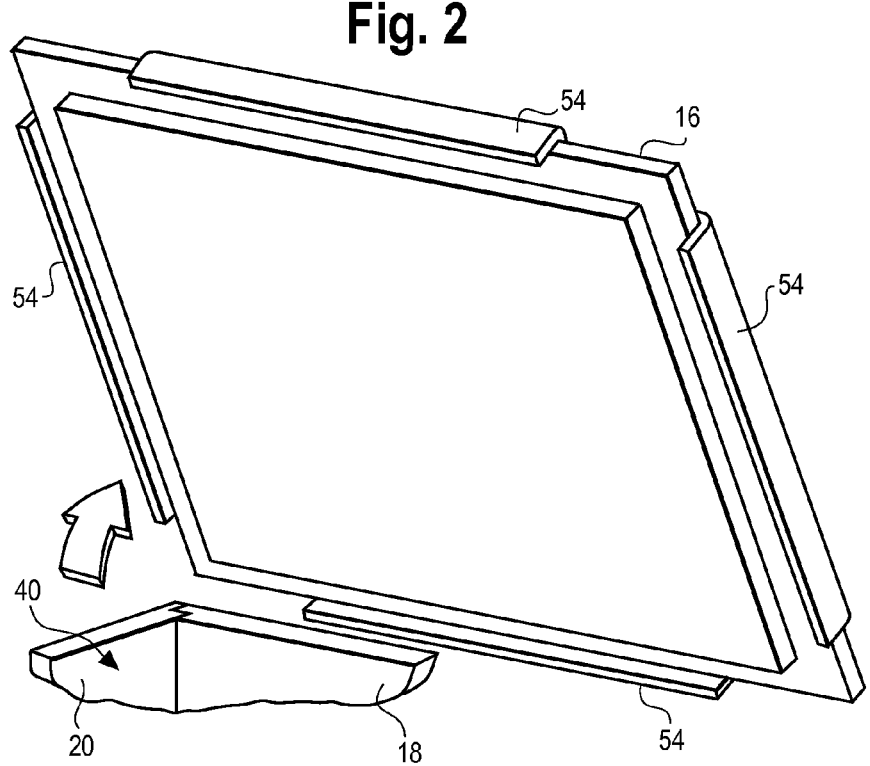
FIG. 2 is a perspective view of a portion of the packaging system of FIG. 1 shown with the lid removed.

FIG. 2 is a perspective view of a portion of the packaging system 10 of FIG. 1 shown with the lid or top panel 16 removed Like the other outer panels, the top panel 16 is configured to interlock with each orthogonally adjacent outer panel, in this case, the two side panels 18 and the two end panels 20. As explained further below, the top panel 16 is the last of the six outer panels to be added to the packaging system 10.

FIG. 3 is an exploded view of the packaging system 10 of FIG. 1. From the bottom up, the product compartment 40 is filled with a spacer 26, two refrigerant layers 28, the payload 56, one refrigerant layer 28 and three frozen layers 30.

The spacer 26 is disposed on top of and adjacent the bottom panel 14. The spacer 26 may comprise a sheet 27 and spaced apart stubs 29 extending about 1¼ inches downward (as shown in the figure) or preferably upward from the sheet 27. The spacer 26 may be made of any suitable material, including without limitation extruded plastic or corrugated.

Each of the two bottom refrigerant layers 28, located between the spacer 26 and the payload 56, may comprise a single unitary structure or, more commonly, multiple refrigerant components (sometimes referred to as "bricks") arranged edge to edge to form a "layer" within the packaging system 10. In the embodiment shown in FIGS. 1 and 3 two refrigerant layers 28 are disposed immediately under the payload 56.

As noted above, the payload 56 may be stacked product containers 57. The product containers 57 may comprise corrugated cardboard boxes for holding laboratory specimens, pharmaceuticals, inoculations, or any other suitable payload that requires a temperature assured environment.

A top refrigerant layer 28 is disposed immediately above the product containers 57. Like the two bottom refrigerant layers 28, the top refrigerant layer 28 may comprise a single unitary structure or, preferably, multiple refrigerant components ("bricks") arranged edge to edge to form a layer.

Three frozen layers 30 are disposed on top of the top refrigerant layer 28. Like the refrigerant layers 28, each frozen layer 30 may comprise a single unitary structure or, more commonly, multiple horizontally arranged frozen components ("bricks") that form a layer within the packaging system 10. In the embodiment shown in FIGS. 1 and 3 three frozen layers 30 are disposed immediately above the top refrigerant layer 28.

The cooling layers, i.e., the refrigerant layers 28 and/or the frozen layers 30, absorb heat. Generally speaking, the refrigerant bricks and the frozen bricks may comprise a foam material having a low weight and high absorbency, a phase change material, and a protective outer container. For example, the refrigerant bricks may comprise a foam material that has been infused with water chilled to about 5 C (41 F) and contained within a plastic brick-shaped enclosure. Similarly, the frozen bricks may comprise a foam material that has been infused with water chilled to about −20 C (−4 F) and contained within a plastic brick-shaped enclosure. The bricks may be rectilinear and shaped like a flattened brick or they may be any suitable three-dimensional shape. The refrigerant bricks and frozen bricks may be similar to those sold under the trademarks PolarPack® and U-tek® by Tegrant Diversified Brands, Inc.

Although the packaging system 10 has been described as having two refrigerant layers 28 below the payload 56 and one refrigerant layer 28 and three frozen layers 30 above the payload 56, it should be understood that this is just one embodiment of the invention, and that the number of refrigerant layers 28 and frozen layers 30 below and above the payload 56 can vary depending on the cooling requirements and shipping time. In addition, although the packaging system 10 described herein does not include cooling components located around the sides of the payload 56, the disclosure should not be interpreted as necessarily excluding such side cooling components.

Optionally, a foam cushioning layer (not shown in the figures) may be placed between the topmost frozen layer 30 and the top panel 16. However, in some applications it is desirable to have a space or clearance of about 1½ inches between the topmost frozen layer 30 and the top panel 16.

Vertical Posts 34

In addition, the packaging system 10 comprises multiple vertical posts 34 located within the product compartment 40 adjacent the side panels 18 and/or the end panels 20. The vertical posts 34 may be hollow wound paper posts like those sold by Sonoco Products Company of Hartsville, S.C. under the trademark SONOPOST®. Alternatively the vertical posts 34 may be made of extruded plastic or any suitable material.

Figure 4:
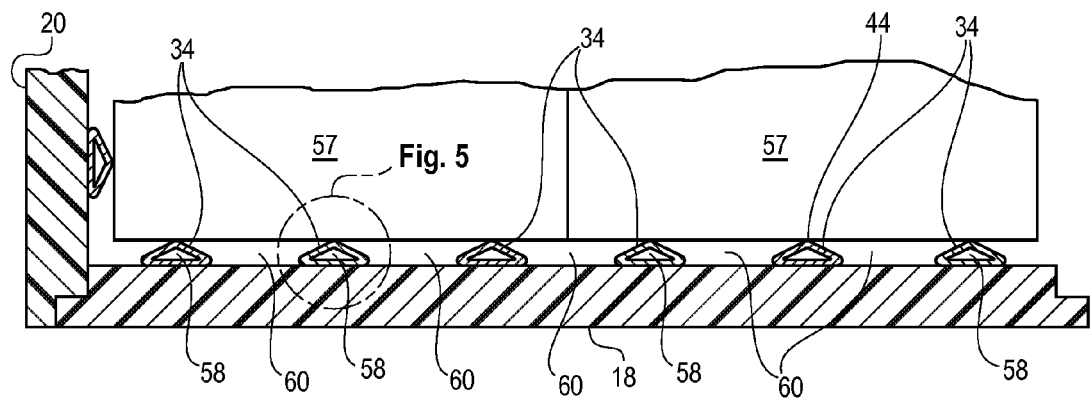
FIG. 4 is a cross-sectional view of the packaging system of FIG. 1 taken along line 4-4.

FIG. 4 is a cross-sectional view of the packaging system 10 of FIG. 1 taken along line 4-4 showing six vertical posts 34 adhered to a side panel 18. The vertical inner edge 44 of each vertical post 34 may abut the interior contents of the packaging system 10, such as the refrigerant layers 28, frozen layers 30 and product containers 57. Each vertical post 34 has an open top end 46 (FIGS. 3 and 6) and an open bottom end and defines a vertical inner space 58 within the post 34. Adjacent pairs of vertical posts 34 define vertically oriented channels 60 between the vertical posts 34 that may be about one inch deep when measured from the inner surface of the side panel 18 or end panel 20 to the product containers 57. The vertical posts 34 may be pre-glued or otherwise affixed to the side panels 18 and the end panels 20.

Figure 5:
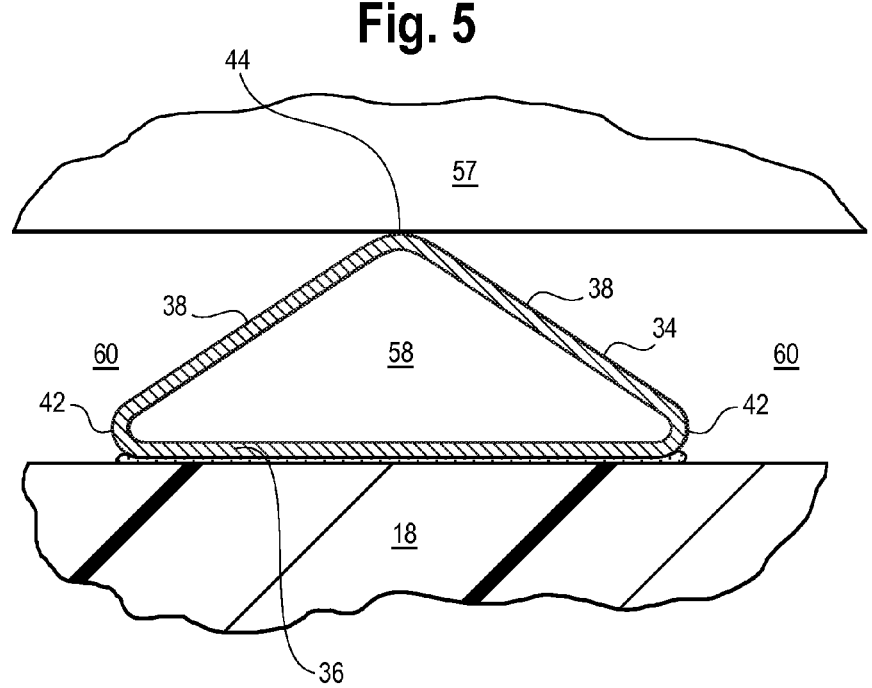
FIG. 5 is a close up view taken from FIG. 4.

FIG. 5 is a close up view of a portion of FIG. 4. The vertical posts 34 may be any suitable cross sectional shape, including circular or rectangular, but triangular is preferred. In a triangular cross sectional profile design such as that shown in FIG. 5, each vertical post 34 comprises an outer facing side 36 adjacent either a side panel 18 (as shown in the figure) or an end panel 20 and two angled sides 38 extending from opposing vertical edges 42 of the outer facing side 36 and meeting along an elongated vertical inner edge or apex 44. Preferably the vertical posts 34 are one inch deep when measured from their outer facing side 36 to their apex 44.

The functions of the vertical posts 34 are explained in the next section.

Theory of Operation

It is theorized that the packaging system 10 takes advantage of the principle of convective air movement by creating flow spaces around the outer perimphery of the product compartment 40 for air to circulate. The bottom spacer 26 separates the bottom refrigerant layers 28 from the bottom panel 14, creating a horizontally oriented space within which air can flow. Without the bottom spacer 26 cool air that settles near the bottom of the product compartment 40 could stagnate, reducing the ability of the system 10 to maintain all the product containers 57 and their contents within a desirable temperature range.

The vertical posts 34 serve at least two functions. First, they reduce the amount of contact between the product containers 57 and the outer panels product containers 56. In designs where the product containers abut the side panels and end panels more heat enters the product containers. Adding vertical posts 34 separates the product containers 57 from the side panels 18 and end panels 20, significantly reducing the areas of contact between the product containers 57 and the side panels 18 and the end panels 20 and thus the transfer of heat from the exterior to the product containers 57.

Second, the vertical posts 34 help facilitate convective air circulation within the product compartment 40 by creating inner spaces 58 within the posts 34 and channels 60 between the posts 34 (and between the side panels 18 and the end panels 20 and the product containers 57) for the movement of air. When the packaging system 10 is assembled, the product compartment 40 contains a certain amount of air.

The air moves within the product compartment 40 because air at different locations has different temperatures and densities. Cooler air (i.e., air cooled by the frozen layers 30) has a higher density and tends to drop down within the product compartment 40. Conversely, as the air at the bottom of the product compartment 40 warms, the warmed air tends to flow upward, thereby setting up a continuously circulating flow of air within the product compartment 40. The vertical posts 34 facilitate this process by providing inner spaces 58 within which the warm air can flow upward and channels 60 within which the cooler air can flow downward. Accordingly, each vertical post 34 should be spaced from the top panel 16 and the bottom panel 14 a sufficient distance to facilitate the flow of warmer air through the vertical inner spaces 58 within each vertical post 34.

Simulation tests indicate that the air within the vertical posts 34 warms up due to the large contact surface between the outer facing side 36 of the vertical posts 34 and the side panels 18 and end panels 20. Air present in the air channels 60 between the vertical posts 34 can also warm up, but generally not as much as the air within the vertical posts 34, because the air between the vertical posts 34 is not as confined. As the air within the vertical posts 34 warms up it rises up within the inner spaces 58 of the vertical posts 34 and exits at the open top ends 46 of the vertical posts 34, where the air is exposed to the frozen layers 30 and the top refrigerant layer 28. As the warm air contacts the frozen layers 30 and top refrigerant layer 28, the air cools down and begins to fall through the air channels 60 between the vertical posts 34 along the sides of the product containers 57 facing the side panels 18 and end panels 20.

The downward convective flow of cooler air against the sides of the product containers 57 helps maintain the product containers 57 at a cool temperature. The product containers 57 located in the middle of the product compartment 40, farthest from any refrigerant bricks or frozen bricks, can be maintained within an acceptable temperature range. Even product containers 57 at the corners of the payload 56 which are most susceptible to increases in temperature (when the ambient temperature is higher than the shipper temperature) can be maintained within an acceptable temperature range.

In another aspect of the invention a method of assembling a temperature assured packaging system is provided. The method may comprise the following steps:

First, the vertical posts 34 may be pre-glued or otherwise affixed to the inner (product) facing surfaces of the side panels 18 and the end panels 20. The vertical posts 34 should be shorter than the side panels 18 and end panels 20 so that their open ends will be spaced from the top panel 16 and the bottom panel 14.

The housing 12 may be assembled by first placing the bottom panel 14 into the bottom tray 22, then inserting a side panel 18 and both end panels 20 into the bottom tray 22 between the bottom tray side walls 24 and the bottom panel 14 to form the three sided enclosure shown in FIG. 6. The top and front of the housing 12 are left open so that the interior contents may be loaded.

The first item loaded into the product compartment 40 is the spacer 26, which is placed on top of the bottom panel 14.

Next, the two bottom refrigerant layers 28 are placed onto the spacer 26, typically by arranging multiple refrigerant bricks to form two refrigerant layers 28.

Next the product containers 57 are stacked within the product compartment 40 on top of the two bottom refrigerant layers 28.

A top refrigerant layer 28 is placed on top of the product containers 57, again by arranging multiple refrigerant bricks into a layer.

The top three frozen layers 30 (typically made of multiple frozen bricks) are placed on top of the top refrigerant layer 28.

The remaining side panel 18 not shown in FIG. 6 is wedged between the bottom tray side wall 24 and the bottom panel 14 to form a four sided enclosure.

The top panel 16 is placed onto the top rims of the side panels 18 and end panels 20 to form the six sided outer housing 12.

Optional corner boards 54 may be glued or otherwise affixed to the edges of the housing 12.

Finally, optional stretch film may be wrapped around the housing 12.

In still another aspect of the invention a method of maintaining a payload within a desired temperature range is provided. The method may comprise the following steps:

(a) loading the payload into a packaging system comprising a housing having a bottom, top and vertical sides, cooling layers disposed above and below the payload, hollow vertical posts disposed between the payload and the vertical sides of the housing, the vertical posts defining inner spaces within the vertical posts and channels between adjacent vertical posts;

(b) allowing relatively warmer air to rise within the inner spaces of the vertical posts until it exits the vertical posts and is cooled by the cooling layers above the payload to form cooled air; and (c) allowing the cooled air to fall through the channels while contacting the payload.

INDUSTRIAL APPLICABILITY

The packaging system 10 may be used to package and ship temperature sensitive products. Typically these products have a specified or required temperature range that must be maintained during a specific shipping duration and while the packaging system is subject to various ambient temperature conditions. For example, a product may be expected to be shipped for 120 hours and be exposed to ambient temperatures of between 30 C and 45 C (86 F and 113 F), but have a temperature tolerance of between 0 C and 15 C (32 F and 59 F). A packaging system according to the present disclosure may be designed to accommodate these requirements.

The packaging system may be used in any industry where temperature sensitive products are shipped, including but not limited to the pharmaceutical and food industries. The packaging system is particularly useful where the user (e.g., the product manufacturer) desires a packaging system having no side refrigerants that can be shipped long distances, including from continent to continent. The use of present packaging system can supplant the use of multiple smaller parcel shipments.

The packaging system 10 can accommodate a full pallet load of products or product containers 57. Accordingly, a typical packaging system 10 may be about 48 inches wide by 48 inches deep by 56 inches tall. The packaging system 10 may be placed on a wooden or other type of pallet and moved with a forklift truck.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

What is claimed is:

1. A packaging system for shipping a temperature sensitive payload, the packaging system comprising:
a housing comprising a bottom panel, a top panel located above and in spaced vertical alignment with the bottom panel, side panels extending vertically between the bottom panel and the top panel, and end panels extending vertically between the bottom panel and the top panel, the housing defining a product compartment, the side panels and end panels defining four vertical corners;
one or more bottom cooling layers located between the bottom panel and the payload;
one or more top cooling layers located between the payload and the top panel; and
four sets of elongated, solid walled, hollow individual vertical posts, each post having a triangular cross-section and comprising an outer facing side adhered to the side panel or end panel and two angled sides extending from opposing vertical edges of the outer facing side and meeting along an elongated vertical inner edge, each angled side forming an acute included angle with the outer facing side, each post having an open top end and an open bottom end and defining a vertical inner space within the post, each set comprising at least five posts arranged in the same orientation on an inner facing surface of a side panel or an end panel in an evenly spaced apart array;
wherein adjacent vertical posts define a vertically oriented channel between the vertical posts, the vertically oriented channels being parallel to the direction of gravity;
wherein the plurality of vertical posts are spaced from the top panel and bottom panel.

2. The packaging system of claim 1 wherein:
each vertical post is about one inch to one and one half inches deep when measured from the outer facing side to the elongated vertical inner edge.

3. The packaging system of claim 1 further comprising:
a spacer disposed within the product compartment adjacent the bottom panel to create a horizontally oriented space within which air can flow.

4. The packaging system of claim 3 wherein:
the spacer comprises a sheet and spaced apart stubs extending upward from the sheet.

5. The packaging system of claim 1 wherein:
the one or more bottom cooling layers comprises at least one refrigerant layer; and
the one or more top cooling layers comprises at least one refrigerant layer and at least one frozen layer.

6. The packaging system of claim 5 wherein:
the one or more top cooling layers comprises a refrigerant layer immediately adjacent the payload and at least one frozen layer above the refrigerant layer.

7. The packaging system of claim 5 wherein:
each refrigerant layer comprises multiple refrigerant components arranged edge to edge; and
each frozen layer comprises multiple frozen components arranged edge to edge.

8. The packaging system of claim 7 wherein:
each frozen component comprises a phase change material enclosed within a protective outer container.

9. The packaging system of claim 8 wherein:
the phase change material is water.

10. The packaging system of claim 1 wherein:
a lower portion of each post is interposed between the bottom cooling layers and either a side panel or an end panel.

* * * * *